(12) United States Patent
Nimry et al.

(10) Patent No.: US 10,430,399 B1
(45) Date of Patent: Oct. 1, 2019

(54) INTRA-OFFICE DOCUMENT TRACKING

(71) Applicant: Wells Fargo Bank, N.A., San Francisco, CA (US)

(72) Inventors: Basil F. Nimry, Des Moines, IA (US); Todd M. Deimerly, Grimes, IA (US); Nicholas Gillis, West Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 411 days.

(21) Appl. No.: 14/880,988

(22) Filed: Oct. 12, 2015

(51) Int. Cl.
*G06F 16/22* (2019.01)
*G06F 16/23* (2019.01)

(52) U.S. Cl.
CPC ...... *G06F 16/2228* (2019.01); *G06F 16/2365* (2019.01)

(58) Field of Classification Search
CPC .......... G06F 17/30321; G06F 16/2228; G06F 16/2365
See application file for complete search history.

(56) References Cited

U.S. PATENT DOCUMENTS

| | | | |
|---|---|---|---|
| 7,260,304 B1 | 8/2007 | Harradine et al. | |
| 7,523,315 B2 * | 4/2009 | Hougaard | G06Q 10/10 713/176 |
| 8,255,366 B1 * | 8/2012 | Bagley | G06F 11/1469 707/646 |
| 8,392,384 B1 * | 3/2013 | Wu | G06F 17/30156 707/693 |
| 8,457,467 B2 | 6/2013 | Harradine et al. | |
| 9,442,807 B1 * | 9/2016 | Zhang | G06F 17/30159 |
| 2003/0173405 A1 * | 9/2003 | Wilz, Sr. | G06F 17/30879 235/462.01 |
| 2008/0303822 A1 | 12/2008 | Taylor et al. | |
| 2009/0001167 A1 * | 1/2009 | Usuba | G06K 7/10 235/462.16 |
| 2009/0049260 A1 * | 2/2009 | Upadhyayula | G06F 3/0608 711/162 |
| 2009/0150251 A1 * | 6/2009 | Zhitomirsky | G06Q 30/06 705/26.1 |
| 2011/0167106 A1 * | 7/2011 | Yamada | G01C 21/20 709/203 |
| 2011/0246416 A1 * | 10/2011 | Prahlad | G06F 17/30156 707/610 |

(Continued)

*Primary Examiner* — Cam Y T Truong
(74) *Attorney, Agent, or Firm* — Shumaker & Sieffert, P.A.

(57) ABSTRACT

Techniques are described for tracking documents within an office or network based on unique metadata keys generated for the documents. The disclosed techniques include generating a key for a document based on metadata extracted from the document, associating the key representing the document with one or more master files that include the document, and then applying the key to the document. To track a lost or disassociated document, the disclosed techniques include either generating the key from the document or reading the key previously applied to the document, and then using the key to re-associate the document with the one or more master files that include the document. According to the disclosed techniques, a metadata key may comprise a series of symbols constructed so as to maintain its aspect ratio or spacing regardless of manipulation of the document to which the key has been applied.

20 Claims, 4 Drawing Sheets

(56) References Cited

U.S. PATENT DOCUMENTS

2014/0074787 A1* 3/2014 Berman .............. G06F 11/1451
707/639
2014/0355069 A1* 12/2014 Caton .................. H04N 1/0087
358/3.28

* cited by examiner

INTRA-OFFICE DOCUMENT TRACKING

TECHNICAL FIELD

The disclosure relates to tracking documents.

BACKGROUND

Documents may routinely become lost or disassociated from a main or master file. When these "lost documents" are found, it may be difficult or even impossible to determine the master file to which the lost documents need to be returned. For example, in the case of physical or hard copies of documents included in a master file folder, a person may remove the individual documents from the file folder and then fail to return all the documents to the file folder, or the individual documents may simply fall out of the file folder. As another example, in the case of digital or soft copies of documents included in a master file stored in a digital database or other digital storage system, the individual documents may become disassociated from the master file in the database due to some error. In either case, in order to return a lost document to its correct master file, a person would need to examine the lost document for any identifying information and then attempt to remember or search for the correct master file for that document.

As one example, this issue may occur within a given office or network of a financial institution that offers different lending products, such as home loans, car loans, business loans, student loans, and the like. In this example, each of the different lending products may require a customer to provide multiple financial and tax documents to the financial institution. In some cases, the receipt and processing of these documents may be time sensitive in order to secure the requested loan and/or to avoid foreclosure or even bankruptcy. If one of the necessary documents becomes lost, the processing and approval of the lending products may be delayed and the customer may need to provide additional copies of the same documents in order to proceed. In addition, even in situations where the documents are not lost, the same document may be needed to process two or more loan requests for same customer. Attempting to reuse the same documents across the different loan products may but difficult or impossible without requiring multiple copies of the same documents from the customer.

SUMMARY

In general, this disclosure describes techniques for tracking documents within an office or network based on one or more unique metadata keys generated for the documents. The disclosed techniques include generating a key for a document based on metadata extracted from the document, associating the key representing the document with one or more master files that include the document, and then applying the key to the document. To track a lost or disassociated document, the disclosed techniques include either generating the key from the document or reading the key previously applied to the document, and then using the key to re-associate the document with the one or more master files that include the document. According to the disclosed techniques, a metadata key may comprise a series of symbols constructed so as to maintain its aspect ratio or spacing regardless of manipulation of the document to which the key has been applied. In some examples, the metadata key may comprise a series of differently spaced dots, lines, or shapes; a series of differently colored dots, lines, or shapes; a series of dots, lines, or shapes with differently overlapping portions; and/or a series of tactile dots, lines, or shapes including raised portions similar to braille or indented portions similar to puncture holes, or the like.

In one example, this disclosure is directed to a method comprising determining, by a computing device, metadata from a document, wherein the metadata includes one or more of a document type, document contents, or document context; generating a key that represents the document based on the metadata determined from the document, wherein the key comprises a series of symbols with a consistent aspect ratio; associating the key that represents the document with one or more master files that include the document; and applying the key to the document, wherein the key maintains the consistent aspect ratio regardless of manipulation of the document.

In another example, this disclosure is directed to a computing device comprising one or more storage units configured to store metadata keys for documents, and one or more processors in communication with the one or more storage units. The one or more processors are configured to determine metadata from a document, wherein the metadata includes one or more of a document type, document contents, or document context; generate a key that represents the document based on the metadata determined from the document, wherein the key comprises a series of symbols with a consistent aspect ratio; associate the key that represents the document with one or more master files that include the document; and apply the key to the document, wherein the key maintains the consistent aspect ratio regardless of manipulation of the document.

In a further example, this disclosure is directed to a non-transitory computer readable medium storing instructions that, when executed, cause one or more processors to determine metadata from a document, wherein the metadata includes one or more of a document type, document contents, or document context; generate a key that represents the document based on the metadata determined from the document, wherein the key comprises a series of symbols with a consistent aspect ratio; associate the key that represents the document with one or more master files that include the document; and apply the key to the document, wherein the key maintains the consistent aspect ratio regardless of manipulation of the document.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
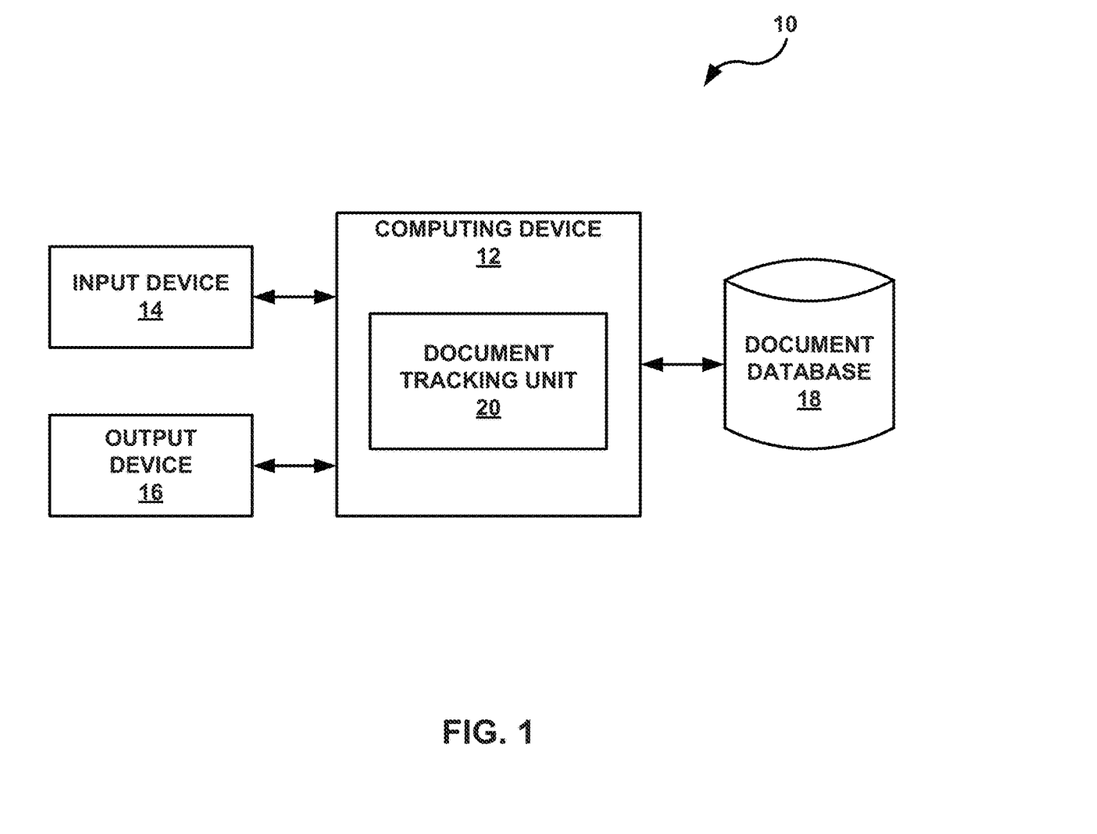
FIG. 1 is a block diagram illustrating an example computing system within an office or network configured to track documents in accordance with the techniques of this disclosure.

FIG. 1 is a block diagram illustrating an example computing system 10 within an office or network configured to track documents in accordance with the techniques of this disclosure. Computing system 10 includes a computing device 12 in communication with an input device 14, an output device 16, and a document database 18. According to the disclosed techniques, computing device 12 includes a document tracking unit 20 configured to generate a unique key based on metadata extracted from a given document, associate the key representing the document with one or more master files that include the document, and apply or embed the key to the document for future tracking. Furthermore, in order to track a lost or disassociated document, document tracking unit 20 is configured to either generate a metadata key from the document or read a metadata key previously applied to or embedded within the document, and then use the metadata key to re-associate the document with one or more master files that include the document.

According to the disclosed techniques, a metadata key may comprise a series of symbols constructed so as to maintain its aspect ratio or spacing regardless of manipulation of the document to which the key has been applied. In some examples, the metadata key may comprise a series of differently spaced dots, lines, or shapes; a series of differently colored dots, lines, or shapes; a series of dots, lines, or shapes with differently overlapping portions; and/or a series of tactile dots, lines, or shapes including raised portions similar to braille or indented portions similar to puncture holes, or the like. These examples of metadata key formats or constructions are merely examples and should not be construed as limiting. The metadata key may be formed or constructed using any series of symbols that are able maintain aspect ratio or spacing regardless of manipulation of the document to which the key has been applied or embedded.

Computing system 10 may be included in a local computer network of a single-location office or entity, or computing system 10 may be included in a distributed computer network, such as an enterprise network, of a multi-location office or entity. As one example, computing system 10 may be included in an office or network of a financial institution that offers different lending products, such as home loans, car loans, business loans, student loans, and the like. Computing system 10 illustrated in FIG. 1 includes only one computing device 12. In other examples, computing system 10 may include multiple different computing devices in communication with each other. Computing device 12 and any other computing devices (not shown) included in computing system 10 may comprise desktop computers, laptops, workstations, wireless devices, network-ready appliances, file servers, print servers, or other devices.

Input device 14 may comprise a scanner, a camera, or other document imaging device. In some examples, input device 14 may comprise a computing device, such as a desktop or laptop computer, or a wireless communication device, such as a smart phone or smart pad, that includes a camera. Output device 16 may comprise a display or a printer. More specifically, output device 16 may include a cathode ray tube (CRT) monitor, a liquid crystal display (LCD), an organic light emitting diode (OLED) display, a laser printer, an inkjet printer, or any other type of device that can generate intelligible output to a user. Document database 18 may be a database maintained local to computing device 12, or may be a database maintained in a server located remote to computing device 12.

In some cases, computing device 12 may communicate with at least one of input device 14, output device 16, or document database 18 via a wired connection, such as via a Universal Serial Bus (USB) connection. In other cases, computing device 12 may communication with at least one of input device 14, output device 16, or document database 18 via a wireless connection via one or more of a wide area network (WAN) (e.g., the Internet), a wireless local area network (WLAN) (e.g., a Wi-Fi network), a wireless personal area network (WPAN) (e.g., a Bluetooth® network), or another wireless communication network.

Conventionally, documents may routinely become lost or disassociated from a main or master file within a given office or network. When these "lost documents" are found, it may be difficult or even impossible to determine the master file to which the lost documents need to be returned. For example, in the case of physical or hard copies of documents included in a master file folder, a person may remove the individual documents from the file folder and then fail to return all the documents to the file folder, or the individual documents may simply fall out of the file folder. As another example, in the case of digital or soft copies of documents included in a master file stored in a digital database or other digital storage system, the individual documents may become disassociated from the master file in the database due to some error. In either case, in order to return a lost document to its correct master file, a person would need to examine the lost document for any identifying information and then attempt to remember or search for the correct master file for that document.

As one example, this issue may occur within a given office or network of the financial institution that offers different lending products. In this example, each of the different lending products may require a customer to provide multiple financial and tax documents to the financial institution. In some cases, the receipt and processing of these documents may be time sensitive in order to secure the requested loan and/or to avoid foreclosure or even bankruptcy. If one of the necessary documents becomes lost, the processing and approval of the lending products may be delayed and the customer may need to provide additional copies of the same documents in order to proceed. In addition, even in situations where the documents are not lost, the same document may be needed to process two or more loan requests for same customer. Attempting to reuse the same documents across the different loan products may but difficult or impossible without requiring multiple copies of the same documents from the customer.

This disclosure describes techniques for tracking documents within an office or network based on unique metadata keys generated for the documents. This disclosure provides a technical solution to the above described issue of lost documents by providing a computerized marking and tracking system used to associate documents and re-associate lost documents with master files that include or refer to the documents.

In accordance with the disclosed techniques, document tracking unit 20 is configured to receive an imaged or digital copy of a document from either input device 14 or document database 18, and extract metadata from the document. In general, metadata is defined as data that describes other data. More specifically, the metadata determined from the document may include one or more of a document type, document contents, or document context. Examples of document types may include customer identification documents, such as copies of social security cards, passports, or ID cards, tax documents, such as copies or originals of W2, W4, or 1040 documents, financial documents, such as bank account statements, credit reports, or loan applications, and the like. Examples of document contents may include the actual numbers, images, or text included in the documents. Examples of document context may include who created the document, the purpose of the document, when the document was created, where the document was created, and how the document was created.

In one example, the disclosed techniques include computerized or digital marking and tracking of documents within an office or network using metadata keys. In this example, each of the documents included in a master file may be imaged or scanned by input device 14 or retrieved from document database 18, and provided to document tracking unit 20 for marking and tracking. According to the techniques, document tracking unit 20 determines metadata from a received document, generates a key that represents the document based on the metadata determined from the document, associates the key that represents the document with one or more master files that include the document, and then applying the key to the document. For example, document tracking unit 20 may print the key onto the document using output device 16 or add the key into the document stored in document database 18. In some examples, document tracking unit 20 may embed the key within a header of a digital or soft copy of the document.

The metadata key applied to the document may comprise a series of symbols having a consistent aspect ratio that is maintained regardless of manipulation of the document. The key may be used to represent the entire document such that all the information included in the document may be recreated from the key generated for the document. For example, the key may include different colors, symbol types or shapes, or aspect ratios defined to represent different pieces of the document. The series of symbols that form the metadata key may maintain their consistent aspect ratio based on principles of triangulation used to determine distances and relative positions of the different symbols of the key. For example, the series of symbols of the key for the document may include one or more of a series of differently spaced dots, lines, or shapes; a series of differently colored dots, lines, or shapes; a series of dots, lines, or shapes with differently overlapping portions; or a series of tactile dots, lines, or shapes including at least one of raised portions or indented portions, or the like.

In another example, the disclosed techniques include computerized or digital identification and re-association of "lost documents" with one or more master files using metadata keys. In this example, a lost document may be imaged or scanned by input device 14 or retrieved from document database 18, and provided to document tracking unit 20 for identification and re-association with one or more master files.

According to the techniques, if a lost document does not include a metadata key, document tracking unit 20 determines metadata from the lost document, generates a key that represents the lost document based on the metadata determined from the lost document, compares the key generated for the lost document with a master key list that includes previously generated metadata keys for other documents included in the master files, and identifies the master files that include the lost document based on the comparison. In this way, document tracking unit 20 re-associates the lost document with the correct master files. In addition, once the master files that include the lost document have been identified, document tracking unit 20 associates the key that represents the re-associated document with the identified master files, and then applies the key to the re-associated document for future tracking.

Furthermore, according to the techniques, if a lost document includes a metadata key, document tracking unit 20 reads the key applied to the lost document, and identifies the master files that include the lost document using the key read from the lost document as an index in a master key list that associates the key that represents the lost document with the master files that include the lost document. In this way, document tracking unit 20 re-associates the lost document with the correct master files.

Figure 2:
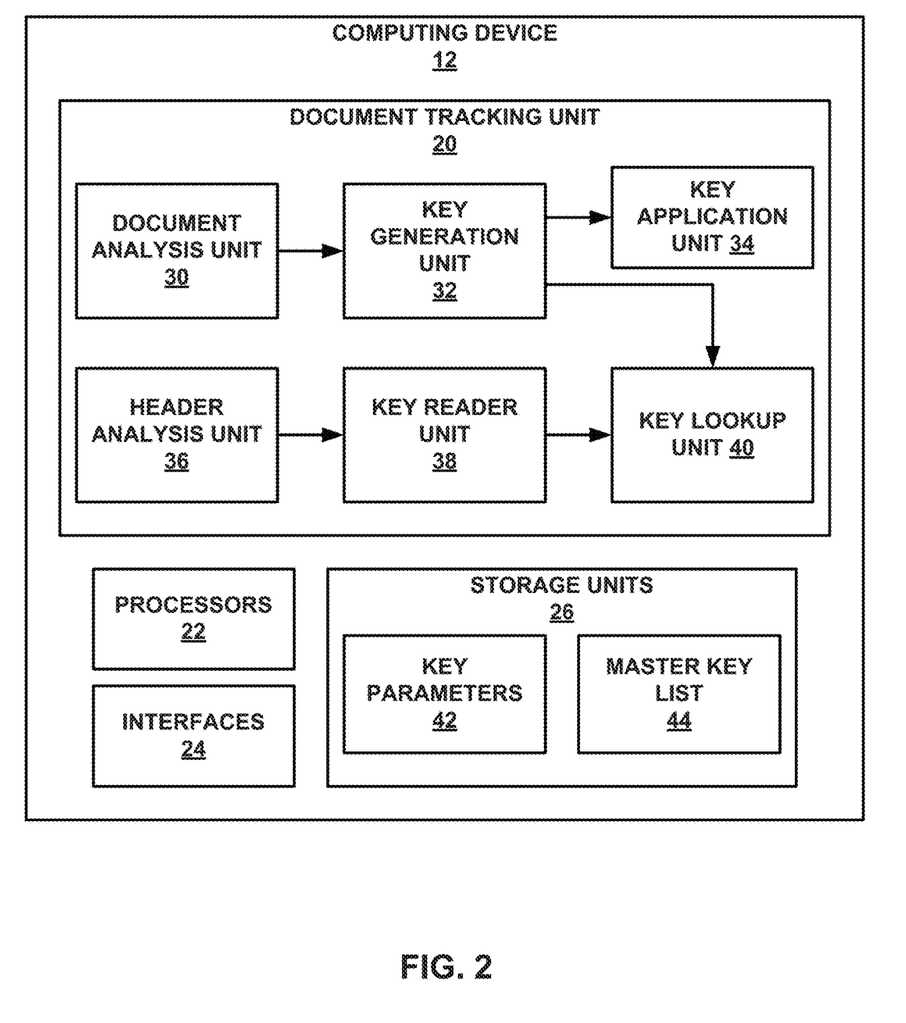
FIG. 2 is a block diagram illustrating an example computing device including a document tracking unit from FIG. 1 in greater detail.

FIG. 2 is a block diagram illustrating an example of computing device 12 including document tracking unit 20 from FIG. 1 in greater detail. In the illustrated example, computing device 12 includes one or more processors 22, one or more interfaces 24, and one or more storage units 26. Document tracking unit 20 may be executable by processors 22 or implemented as one or more hardware units of computing device 12. As illustrated in the example of FIG. 2, document tracking unit 20 includes a document analysis unit 30, a key generation unit 32, a key application unit 34, a header analysis unit 36, a key reader unit 38, and a key lookup unit 40. The architecture of computing device 12 illustrated in FIG. 2 is shown for exemplary purposes only and computing device 12 should not be limited to this architecture. In other examples, computing device 12 may be configured in a variety of ways.

Although not shown in FIG. 2, each of the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 22, in one example, are configured to implement functionality and/or process instructions for execution within computing device 12. For example, processors 22 may be capable of processing instructions stored by storage units 26. Processors 22 may include, for example, microprocessors, digital signal processors (DSPs), application specific integrated circuits (ASICs), field-programmable gate array (FPGAs), or equivalent discrete or integrated logic circuitry.

Computing device 12 may utilize interfaces 24 to communicate with external devices via one or more wired or wireless connections. In some examples, computing device 12 utilizes interfaces 24 to communicate with external devices such as input device 14, output device 16, and/or document database 18, from FIG. 1. Interfaces 24 may be universal serial bus (USB) interfaces, optical interfaces, or network interfaces cards, or any other type of interfaces capable of sending and receiving information. Examples of such network interfaces may include Ethernet, Wi-Fi, or Bluetooth radios.

Storage units 26 may store an operating system (not shown) that controls the operation of components of computing device 12. For example, the operating system may facilitate the communication of document tracking unit 20 with processors 22, interfaces 24, and storage units 26. In some examples, storage units 26 are used to store program instructions for execution by processors 22. Storage units 26 may also be configured to store information within computing device 12 during operation. Storage units 26 may be used by software or applications (e.g., document tracking unit 20) running on processors 22 of computing device 12 to temporarily store information during program execution (e.g., key parameters 42 and master key list 44.)

Storage units 26 may include a computer-readable storage medium or computer-readable storage device. In some examples, storage units 26 include one or more of a short-term memory or a long-term memory. Storage units 26 may include, for example, random access memories (RAM), dynamic random access memories (DRAM), static random access memories (SRAM), magnetic hard discs, optical discs, floppy discs, flash memories, or forms of electrically programmable memories (EPROM) or electrically erasable and programmable memories (EEPROM).

In one example, this disclosure describes techniques for generating metadata keys and applicable logic to determine how the keys are formed to ensure that each of the keys is unique to a given document, customer, and interaction. For example, document analysis unit 30 of document tracking unit 20 may analyze a received document to extract metadata from contents of the document. Document analysis unit 30 may receive the document from a scanner or other imaging device, such as input device 14 from FIG. 1, or from a digital storage device, such as document database 18 from FIG. 1. Key generation unit 32 then uses the extracted metadata from the document to generate a metadata key comprising a series of symbols that represent the document.

Key generation unit 32 may generate the key according to key parameters 42 stored in storage units 26. Key parameters 42 may include, for example, different colors, symbol types or shapes, or aspect ratios used to represent different pieces of the document. Key parameters 42 may be set or defined for a given office or network by an administrator. Although illustrated in FIG. 2 as being stored locally in storage units 26 of computing device 12, in other examples key parameters 42 may be stored in a server or other storage device external to computing device 12.

This portion of the disclosed techniques is focused on creation of a metadata key to uniquely identify a document included in a master file. In some examples, the techniques may be used to create a metadata key for each of a plurality of documents included in the master file. In order to create the metadata key, document analysis unit 30 is configured to identify the key components or unique characteristics (i.e., metadata) of the document such as the document type, document contents, and document context. In some examples, these key components may include individual unique components including individual parts of a signature on the document, a date of the document, an owner or creator of the document, or the like. Key generation unit 32 is configured to generate the unique metadata key that represents this key information in the document.

According to the techniques of this disclosure, the unique metadata key generated for the document may be used to track the document. In particular, the unique metadata key may be used to associate the document with its master file and, if the document becomes lost, re-associate the lost document with its master file. For example, after generating the key for the document, key generation unit 32 may associate the key that represents the document with one or more master files that include or refer to the document. For example, key generation unit 32 may store the metadata key for the document in master key list 44 as an index that identifies the one or more master files that include or refer to the document. Although illustrated in FIG. 2 as being stored locally in storage units 26 of computing device 12, in other examples master key list 44 may be stored in a server or other storage device external to computing device 12. Master key list 44 is described in more detail below with respect to FIG. 3.

In another example, this disclosure describes techniques for applying the metadata key onto either a physical version of the document or a digital copy of the document after the document is imaged. In this example, the metadata key applied to the document enables later tracking if the document becomes detached or disassociated from its master file. For example, key application unit 34 is configured to apply the metadata key to the document. In one case, key application unit 34 may print the key onto the physical or hard copy version of the document using printer, such as output device 16 from FIG. 1. In another case, key application unit 34 may add the key into the digital or soft copy version of the document and then store the modified document in a digital storage device, e.g., in document database 18 from FIG. 1. For example, key application unit 34 may embed the key within the header of the digital or soft copy version of the document.

This portion of the disclosed techniques is focused on applying the unique metadata key to whitespace or other open or available area on either a front side or a back side of the document for later tracking if the document is lost, misplaced or disassociated from its master file. For example, as discussed above, this may include printing or stamping the key onto an original physical document to assist with tracking, or adding the key into an original digital document or imaged version of the physical document. Because the document itself is used to create the key based on its contents, the key is unique to the document. The key applied to the document may then be used to index the document to allow the document to be associated with its master file.

The key may be used to represent the entire document such that all the information included in the document may be recreated from the key generated for the document. For example, in the case where the key is embedded within header information of the digital or soft copy version of the document, key application unit 34 may be configured to update the metadata key for the document each time a change is done to the document. In additional examples, key application unit 34 may identify one or more additional documents related to the document, and apply one or more metadata keys that represent the one or more additional documents to the document. For example, key application unit 34 may identify multiple previous versions or iterations of the current document, and apply the metadata key representing the current document as well as the metadata keys representing each of the previous versions to the current document. As another example, key application unit 34 may identify one or more other documents that are also included or referred to in the same master file as the current document, and apply the metadata key representing the current document as well as the metadata keys representing each of the other documents to the current document.

In some examples, in addition to the metadata key, key application unit 34 may include additional information into header information of the document. For example, key application unit 34 may include one or more of key parameters 42 in the header information of the document. As discussed above, key parameters 42 may include color, symbol type or shape, or aspect ratio used to represent different pieces of the document for a given office or network. By including key parameters 42 in the header information of the document, the header information may define how to read the metadata key that is applied to the document.

This disclosure describes the metadata key as a series of symbols with a consistent aspect ratio where the key maintains the consistent aspect ratio regardless of manipulation of the document to which the metadata key is applied. The series of symbols that makes up the metadata key is constructed such that readability of the symbols applied to the document is not affected by changes in the aspect ratio of the document. In one example, the series of symbols that makes up the metadata key is a series of spaced apart dots. In another example, the series of symbols that makes up the metadata key is a series of colored lines or shapes. The color and position of the lines or shapes, including any overlapping portions, may contribute to the information represented by the series of symbols. In a further example, the key may be printed on a physical document using a series of tactile dots and symbols including raised portions, similar to braille, or indented portions, similar to puncture holes.

The series of symbols that form the metadata key may maintain their consistent aspect ratio based on principles of triangulation used to determine distances and relative positions of the different symbols of the key. In this way, the usage of the described series of symbols, e.g., dots, lines and/or shapes, as the metadata key allows the key to be re-sized in the imaging process while not corrupting the key. This is due to triangulation and how the series of symbols keep their aspect ratio consistent regardless of manipulation of the document. In addition, the series of symbols in a spatial area used as the metadata key does not become blurry as the key is reimaged. The series of symbols may be distinguished from bar codes, because the series of symbols is able to maintain their relationship to each other as they are scaled up and/or down.

In the case of a lost document that has become separated or disassociated from its master file before a metadata key has been created for or applied to the document, document analysis unit 30 and key generation unit 32 may generate the metadata key for the lost document as described above. Key lookup unit 40 of document tracking unit 20 may then compare the key that was generated for the lost document with previously generated metadata keys included in master key list 44.

As an example, master key list 44 may include the previously generated metadata keys that represent other documents that are also included or referred to in the same master file as the lost document. Key lookup unit 40 may be able to identify the master file for the lost document by matching one or more of key parameters 42 that are common between the key generated for the lost document and the previously generated keys. These common key parameters may be linked to the master file.

In the case of a lost document that has become separated or disassociated from its master file after applying the metadata key to the document, header analysis unit 36 may first read the header information from the lost document to determine how to read the key applied to the document, and key reader unit 38 may read the key applied to the document based on the header information of the document. Key lookup unit 40 may then be able to identify the master file that includes or refers to the lost document using the key read from the lost document as an index in master key list 44. Master key list 44 may associate the key that represents the lost document with the master file that includes or refers to the document.

In the case where a document is included in two or more master files, e.g., a W2 for two simultaneous loans requested by the same customer (e.g., one for a credit card limit increase and the other for a mortgage loan for the given customer), the techniques of this disclosure enable the customer to submit only one copy of the document, e.g., the W2, for use in both master files. In this case, the metadata key generated for the document may be associated with both master files by master key list 44. In this way, the techniques enable tracking of the document submitted by the customer with respect to more than one master file. In addition, the techniques may enable recognition of a new version of the document that is later submitted by the customer. The customer would not need to submit two copies of the document for the two distinct master files because the metadata key would allow the document attached to the customer to be shared across two or more master files without requiring duplicate documents.

Figure 3:
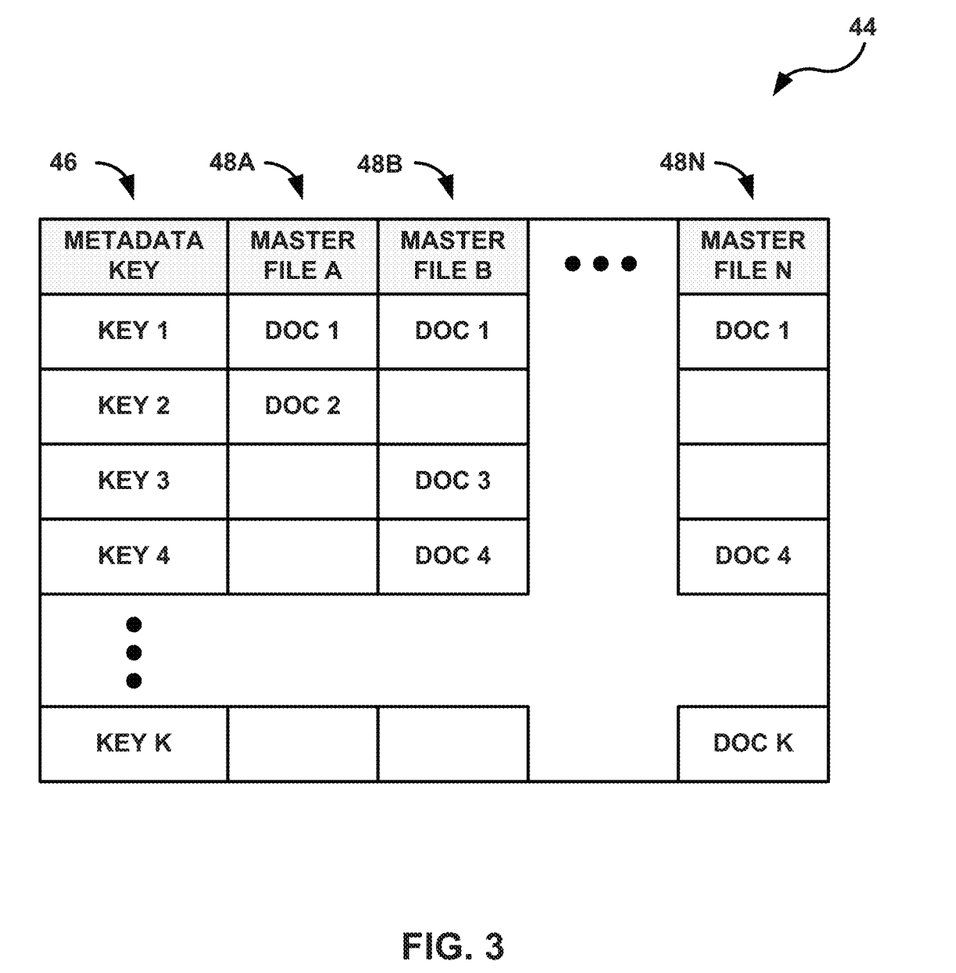
FIG. 3 is a conceptual diagram illustrating an example master key list maintained by the document tracking unit from FIG. 2.

FIG. 3 is a conceptual diagram illustrating an example of master key list 44 maintained by document tracking unit 20 from FIG. 2. In the example of FIG. 3, master key list 44 is structured as a table that includes metadata key indices 46 used to associate documents represented by the metadata keys with master files 48A-48N (hereinafter "master files 48") that include or refer to the documents. The structure of master key list 44 illustrated in FIG. 3 is merely only example structure and should not be considered limiting. In other examples, master key list 44 may comprise a different structure.

As shown in FIG. 3, master key list 44 may include a plurality of different metadata keys 46 generated for each of the different documents within a given office or network. As discussed above, the metadata keys 46 may be generated for the different documents according to key parameters, e.g., key parameters 42 from FIG. 2, that are set or defined for the given office or network by an administrator. Each of metadata keys 46 represents one document and is used to associate that document with one or more of master files 48.

In one example illustrated in FIG. 3, metadata key 1 represents document 1 ("doc 1"), which is associated with master file A 48A, master file B 48B, and master file N 48N. In another example illustrated in FIG. 3, metadata key 2 represents document 2 ("doc 2"), which is associated with only master file A 48A. In an additional example illustrated in FIG. 3, metadata key 3 represents document 3 ("doc 3"), which is associated with only master file B 48B. In a further example illustrated in FIG. 3, metadata key 4 represents document 4 ("doc 4"), which is associated with master file B 48B and master file N 48N. In a final example illustrated in FIG. 3, metadata key K represents document K ("doc K"), which is associated with only master file N 48N.

Figure 4:
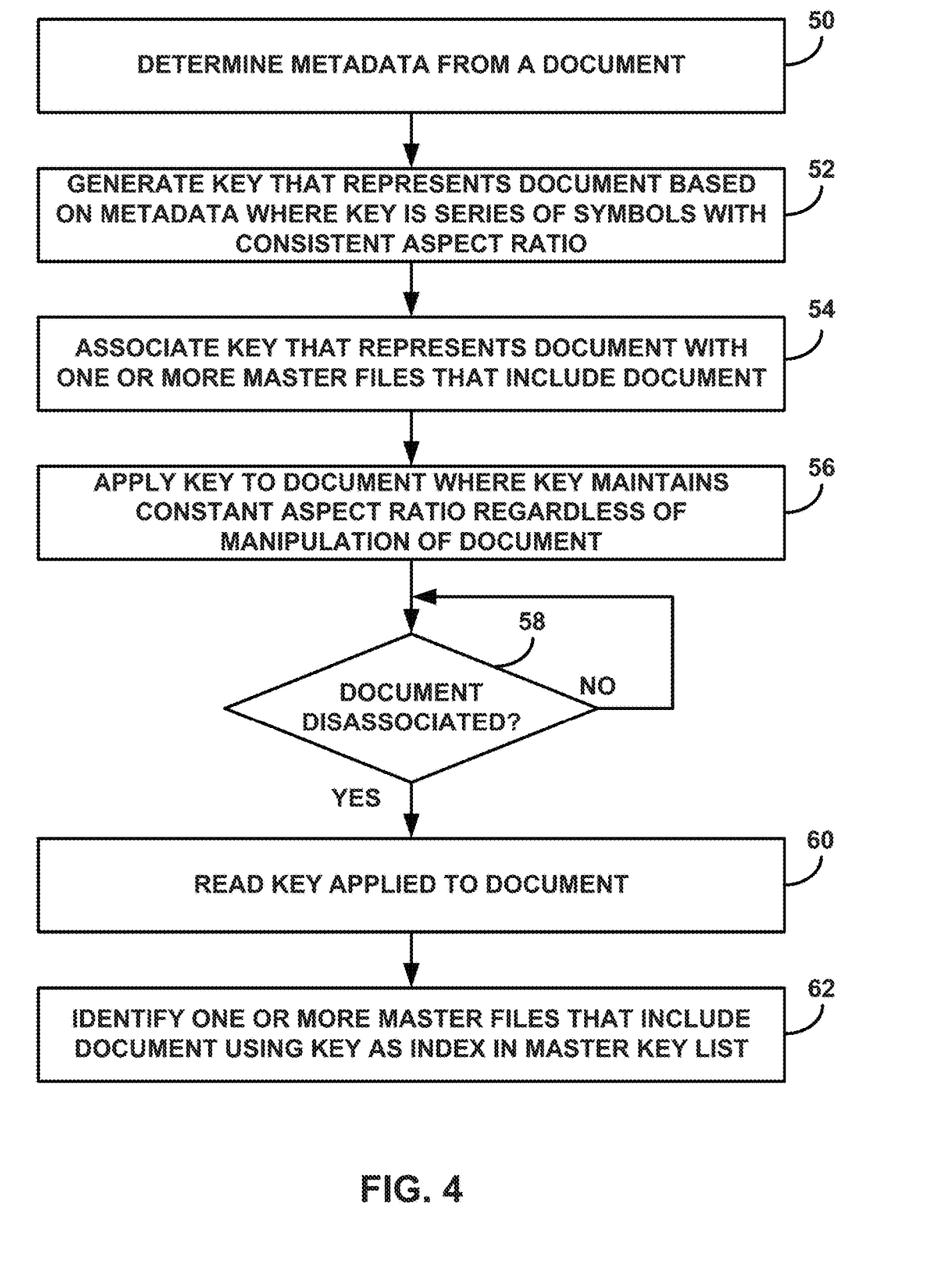
FIG. 4 is a flowchart illustrating an example document tracking operation that uses metadata keys to represent documents and associate documents with master files, in accordance with the techniques of this disclosure.

FIG. 4 is a flowchart illustrating an example document tracking operation that uses metadata keys to represent documents and associate the documents with master files, in accordance with the techniques of this disclosure. The example operation of FIG. 4 is described with respect to document tracking unit 20 of computing device 12 from FIGS. 1 and 2.

Document tracking unit 20 of computing device 12 may receive a document from either input device 14 or document database 18. In one example, input device 14 may comprise a scanner or other document imaging device that generates a digital or soft copy version of a physical or hard copy document and provides the digital version of the document to computing device 12 for processing by document tracking unit 20. In another example, computing device 12 may retrieve a digital or soft copy of a document, which may be a previously scanned or imaged version of a physical document, from document database 18 for processing by document tracking unit 20.

According to the disclosed techniques, document analysis unit 30 of document tracking unit 20 determines metadata from the received document (50). The metadata of the document may include one or more of a document type, document contents, or document context. Based on the metadata determined from the document, key generation unit 32 generates a metadata key that represents the document where the key comprises a series of symbols with a consistent aspect ratio (52). The key may be generated according to key parameters 42 that include different colors, symbol types or shapes, or aspect ratios used to represent different pieces of the document within a given office or network.

As described in more detail above, the key may be used to represent the entire document such that all the information included in the document may be recreated from the key generated for the document. The series of symbols that form the metadata key may maintain their consistent aspect ratio based on principles of triangulation used to determine distances and relative positions of the different symbols of the key. For example, the series of symbols of the key for the document may include one or more of a series of differently spaced dots, lines, or shapes; a series of differently colored dots, lines, or shapes; a series of dots, lines, or shapes with differently overlapping portions; or a series of tactile dots, lines, or shapes including at least one of raised portions or indented portions, or the like. These examples of metadata key formats or constructions are merely examples and should not be construed as limiting. The metadata key may be formed or constructed using any series of symbols that are able maintain aspect ratio or spacing regardless of manipulation of the document to which the key has been applied or embedded.

In addition, the key may be used to index the document in master key list 44 in order to identify a master file that includes or refers to the document. In the case where the received document is a "lost document" that has been separated or disassociated from the master file, key lookup unit 40 of document tracking unit 20 may compare the key that was generated for the document with previously generated metadata keys included in master key list 44. Key lookup unit 40 may then be able to identifying the master file that includes or refers to the lost document based on the comparison and, therefore, re-associate the lost document with the correct master file.

As an example, master key list 44 may include the previously generated metadata keys that represent other documents that are also included or referred to in the same master file as the lost document. Key lookup unit 40 may be able to identifying the master file for the lost document by matching one or more of key parameters 42 (e.g., color, symbol type or shape, or aspect ratio) that are common between the key generated for the lost document and the previously generated keys. These common key parameters may be linked to the master file.

Returning to the flowchart illustrated in FIG. 4, after generating the key for the document, key generation unit 32 associates the key that represents the document with one or more master files that include or refer to the document (54). For example, key generation unit 32 may store the metadata key for the document in master key list 44 as an index that identifies the one or more master files that include or refer to the document. Key application unit 34 of document tracking unit 20 then applies the key to the document where the key maintains the consistent aspect ratio regardless of manipulation of the document (56). In one case, key application unit 34 may print the key onto the physical or hard copy version of the document. In another case, key application unit 34 may add or embed the key into the digital or soft copy version of the document. For example, in the case where the key is embedded within header information of the digital or soft copy version of the document, key application unit 34 may be configured to update the metadata key for the document each time a change is done to the document. In either case, to apply the key to the document, key application unit 34 may communicate with output device 16, which may be a display or a printer.

In some examples, key application unit 34 may also include one or more of key parameters 42 (e.g., color, symbol type or shape, or aspect ratio) used to represent different pieces of the document in header information of the document. In this way, the header information may define how to read the metadata key applied to the document. For example, key parameters 42 may be set or defined for a given office or network by an administrator. In this way, if the document becomes lost or disassociated with the master file, a key reader within another office or network may still be able to read the key applied to the document.

In additional examples, key application unit 34 may identify one or more additional documents related to the document, and apply one or more metadata keys that represent the one or more additional documents to the document. For example, key application unit 34 may identify multiple previous versions or iterations of the current document, and apply the metadata key representing the current document as well as the metadata keys representing each of the previous versions to the current document. As another example, key application unit 34 may identify one or more other documents that are also included or referred to in the same master file as the current document, and apply the metadata key representing the current document as well as the metadata keys representing each of the other documents to the current document. In this example, the key representing the current document may not even need to be associated with the master file because all of the documents included in the master file are represented by the metadata keys applied to the current document.

Again returning to the flowchart illustrated in FIG. 4, if the document becomes disassociated with the one or more master files after applying the key to the document (YES branch of 58), document tracking unit 20 of computing device 12 may receive the "lost document" including the applied metadata key from either input device 14 or document database 18. Header analysis unit 36 of document tracking unit 20 may first read header information from the lost document to determine how to read the key applied to the document. In this example, the header information of the lost document may include one or more of key parameters 42 set for the office or network that includes computing device 12. In other examples, the header information of the lost document may include other key parameters set for another office or network in order to define how to read the key applied to the lost document.

Once document tracking unit 20 has determined how to read the key applied to the lost document, key reader unit 38 of document tracking unit 20 reads the key applied to the document (60). Key lookup unit 40 may then be able to identify the master file that includes or refers to the lost document using the key read from the lost document as an index in master key list 44 and, therefore, re-associate the lost document with the correct master file (62). As discussed above, master key list 44 may associate the key that represents the lost document with the master file that includes or refers to the document. In this way, the key generated based on metadata of the document may be used to track the document at least within a given office or network.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A computer-implemented method comprising:
   determining, by a computing device, metadata from a digital copy, a physical copy, or a hard copy of a document, wherein the metadata includes one or more of a document type, document contents, or document context, wherein the computing device includes one or more processors;
   generating, by the computing device, a key that represents the document based on the metadata determined from the digital copy, the physical copy, or the hard copy of the document in order to track the document within a network, wherein the key comprises a series of symbols with a consistent aspect ratio;
   associating, using the computing device, the key that represents the document with one or more master files that include the document, wherein associating the key with the one or more master files comprises storing the key in a master key list as an index that identifies the one or more master files that include the document;
   applying, using the computing device, the key to the document, wherein the key maintains the consistent aspect ratio in response to manipulation of the key regardless of manipulation of the document, and wherein the key maintains the consistent aspect ratio based on principles of triangulation used to determine distances and relative positions of different symbols of the key;
   when the document is disassociated with the one or more master files within the network, comparing, using the computing device, the key that represents the document with the master key list; and
   identifying, using the computing device, the one or more master files that include the document based on the comparison to re-associate the document with the identified one or more master files.

2. The method of claim 1, wherein determining the metadata comprises determining the metadata from the digital copy, the method further comprising receiving, by the computing device, the digital copy of the document from one of an imaging device in communication with the computing device or a document database in communication with the computing device.

3. The method of claim 1, wherein applying the key to the document comprises one of printing the key onto the physical copy or the hard copy of the document or adding the key into the digital copy of the document.

4. The method of claim 1, further comprising including key parameters in header information of the document, wherein the key parameters define how to read the key applied to the document.

5. The method of claim 1, further comprising:
identifying one or more additional documents related to the document; and
applying one or more metadata keys that represent the one or more additional documents to the document.

6. The method of claim 1, wherein the document is disassociated with the one or more master files prior to generating the key for the document,
wherein comparing the key that represents the document with the master key list comprises, after generating the key based on the metadata determined from the digital copy, the physical copy, or the hard copy of the document, comparing the key generated for the document with previously generated metadata keys included in the master key list, wherein the previously generated metadata keys represent other documents included in the one or more master files;
wherein identifying the one or more master files that include the document based on the comparison comprises matching one or more key parameters that are common between the key generated for the document and the previously generated metadata keys, and identifying the one or more master files that include the other documents represented by the previously generated metadata keys from the master key list; and
wherein, after identifying the one or more master files that include the document, the key is associated with the identified one or more master files and applied to the document.

7. The method of claim 1, wherein the document becomes disassociated with the one or more master files after applying the key to the document,
wherein comparing the key that represents the document with the master key list comprises reading the key applied to the document, and performing a lookup in the master key list using the key read from the document as the index in the master key list; and
wherein identifying the one or more master files that include the document based on the comparison comprises identifying the one or more master files that include the document represented by the key from the master key list.

8. The method of claim 7, further comprising, prior to reading the key applied to the document, reading header information from the document, wherein the header information includes key parameters that define how to read the key applied to the document.

9. The method of claim 1, wherein the series of symbols of the key for the document comprises one or more of:
a series of differently spaced dots, lines, or shapes;
a series of differently colored dots, lines, or shapes;
a series of dots, lines, or shapes with differently overlapping portions; or
a series of tactile dots, lines, or shapes including at least one of raised portions or indented portions.

10. A computing device comprising:
one or more storage units configured to store metadata keys for documents; and one or more processors in communication with the one or more storage units and configured to:
determine metadata from a digital copy, a physical copy, or a hard copy of a document, wherein the metadata includes one or more of a document type, document contents, or document context;
generate a key that represents the document based on the metadata determined from the digital copy, the physical copy, or the hard copy of the document in order to track the document within a network, wherein the key comprises a series of symbols with a consistent aspect ratio;
associate the key that represents the document with one or more master files that include the document, wherein, to associate the key with the one or more master files, the one or more processors are configured to store the key in a master key list as an index that identifies the one or more master files that include the document;
apply the key to the document, wherein the key maintains the consistent aspect ratio in response to manipulation of the key regardless of manipulation of the document, and wherein the key maintains the consistent aspect ratio based on principles of triangulation used to determine distances and relative positions of different symbols of the key;
when the document is disassociated with the one or more master files within the network, compare the key that represents the document with the master key list; and
identify the one or more master files that include the document based on the comparison to re-associate the document with the identified one or more master files.

11. The computing device of claim 10, wherein to determine the metadata, the one or more processors determine the metadata from the digital copy, and wherein the one or more processors are configured to receive the digital copy of the document from one of an imaging device in communication with the computing device or a document database in communication with the computing device.

12. The computing device of claim 10, wherein the one or more processors are configured to one of print the key onto the physical copy or the hard copy of the document or add the key into the digital copy of the document.

13. The computing device of claim 10, wherein the one or more processors are configured to include key parameters in header information of the document, wherein the key parameters define how to read the key applied to the document.

14. The computing device of claim 10, wherein the one or more processors are configured to:
identify one or more additional documents related to the document; and
apply one or more metadata keys that represent the one or more additional documents to the document.

15. The computing device of claim 10, wherein the document is disassociated with the one or more master files prior to generating the key for the document,
wherein, to compare the key that represents the document with the master key list, the one or more processors are configured to compare the key generated for the document with previously generated metadata keys included in the master key list, wherein the previously generated metadata keys represent other documents included in the one or more master files;
wherein, to identify the one or more master files that include the document based on the comparison, the one or more processors are configured to match one or more key parameters that are common between the key generated for the document and the previously generated metadata keys, and identify the one or more master files that include the other documents represented by the previously generated metadata keys from the master key list; and
wherein, after the one or more processors identify the one or more master files that include the document, the key is associated with the identified one or more master files and applied to the document.

16. The computing device of claim 10, wherein the document becomes disassociated with the one or more master files after the key is applied to the document,
  wherein, to compare the key that represents the document with the master key list, the one or more processors are configured to read the key applied to the document, and perform a lookup in the master key list using the key read from the document as the index in the master key list; and
  wherein, to identify the one or more master files that include the document, the one or more processors are configured to identify the one or more master files that include the document represented by the key from the master key list.

17. The computing device of claim 16, wherein the one or more processors are configured to, prior to reading the key applied to the document, read header information from the document, wherein the header information includes key parameters that define how to read the key applied to the document.

18. The computing device of claim 10, wherein the series of symbols of the key for the document comprises one or more of:
  a series of differently spaced dots, lines, or shapes;
  a series of differently colored dots, lines, or shapes;
  a series of dots, lines, or shapes with differently overlapping portions; or
  a series of tactile dots, lines, or shapes including at least one of raised portions or indented portions.

19. A non-transitory computer readable medium storing instructions that, when executed, cause one or more processors to;
  determine metadata from a digital copy, a physical copy, or a hard copy of a document, wherein the metadata includes one or more of a document type, document contents, or document context;
  generate a key that represents the document based on the metadata determined from the digital copy, the physical copy, or the hard copy of the document in order to track the document within a network; wherein the key comprises a series of symbols with a consistent aspect ratio;
  associate the key that represents the document with one or more master files that include the document, wherein the instructions cause the one or more processors to store the key in a master key list as an index that identifies the one or more master files that include the document;
  apply the key to the document, wherein the key maintains the consistent aspect ratio in response to manipulation of the key regardless of manipulation of the document, and wherein the key maintains the consistent aspect ratio based on principles of triangulation used to determine distances and relative positions of different symbols of the key;
  when the document is disassociated with the one or more master files within the network, compare the key that represents the document with the master key list; and
  identify the one or more master files that include the document based on the comparison to re-associate the document with the identified one or more master files.

20. The non-transitory computer readable medium of claim 19, wherein the document becomes disassociated with the one or more master files after the key is applied to the document,
  wherein the instructions that cause the one or more processors to compare the key that represents the document with the master key list cause the one or more processors to read the key applied to the document, and perform a lookup in the master key list using the key read from the document as the index in the master key list; and
  wherein the instructions that cause the one or more processors to identify the one or more master files that include the document based on the comparison cause the one or more processors to identify the one or more master files that include the document represented by the key from the master key list.

* * * * *